United States Patent

[11] 3,587,134

[72] Inventor Charles N. Premo
 Springfield, Mass.
[21] Appl. No. 799,445
[22] Filed Feb. 14, 1969
[45] Patented June 28, 1971
[73] Assignee Koehring Company, Milwaukee, Wis.

[54] MOLD-CHARGING APPARATUS
 6 Claims, 6 Drawing Figs.
[52] U.S. Cl. ................................................ 18/5, 18/30
[51] Int. Cl. .................................................... B29d 27/04
[50] Field of Search ........................................... 18/5 (P),
 2.1, 30 (PG), 30 (RV)

[56] References Cited
 UNITED STATES PATENTS
 2,755,508  7/1956  Maccaferri .................. (18/30RV)
 2,865,050  12/1958  Strauss ......................... (18/30)
 3,159,875  12/1964  Stutz et al. ..................... 18/5

Primary Examiner—H. A. Kilby, Jr.
Attorney—Chapin, Neal and Dempsey

ABSTRACT: An apparatus for charging expandable thermoplastic beads to a single or multicavity mold wherein a mold face is provided with a feeder slot which is common to each cavity of said mold face, and wherein each cavity communicates with said common feeder slot through at least one filling slot which has gating means reciprocally disposed therein.

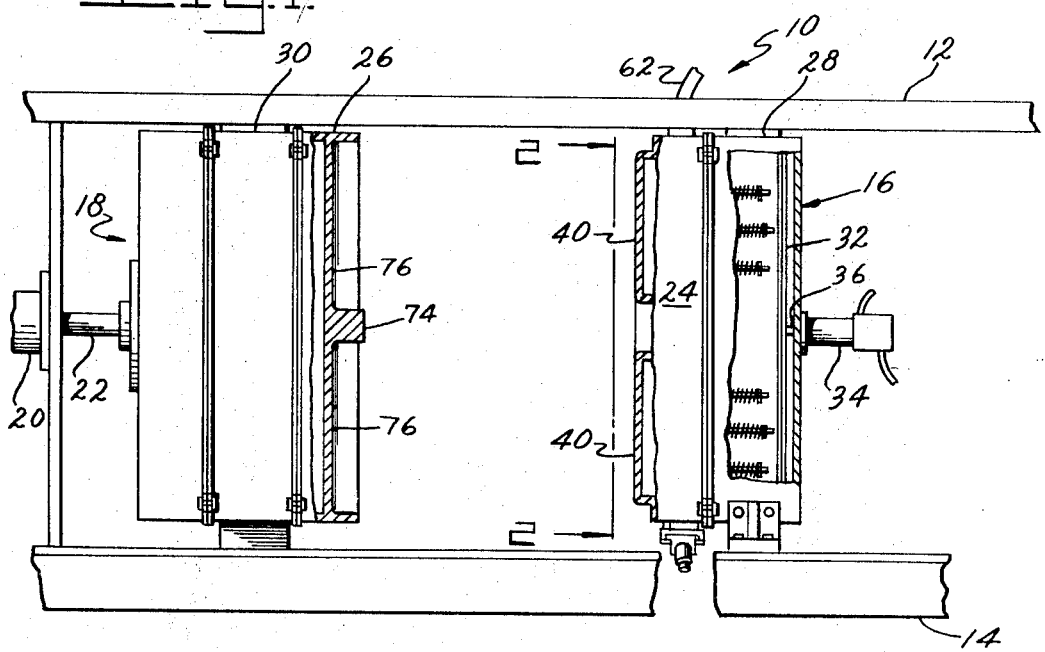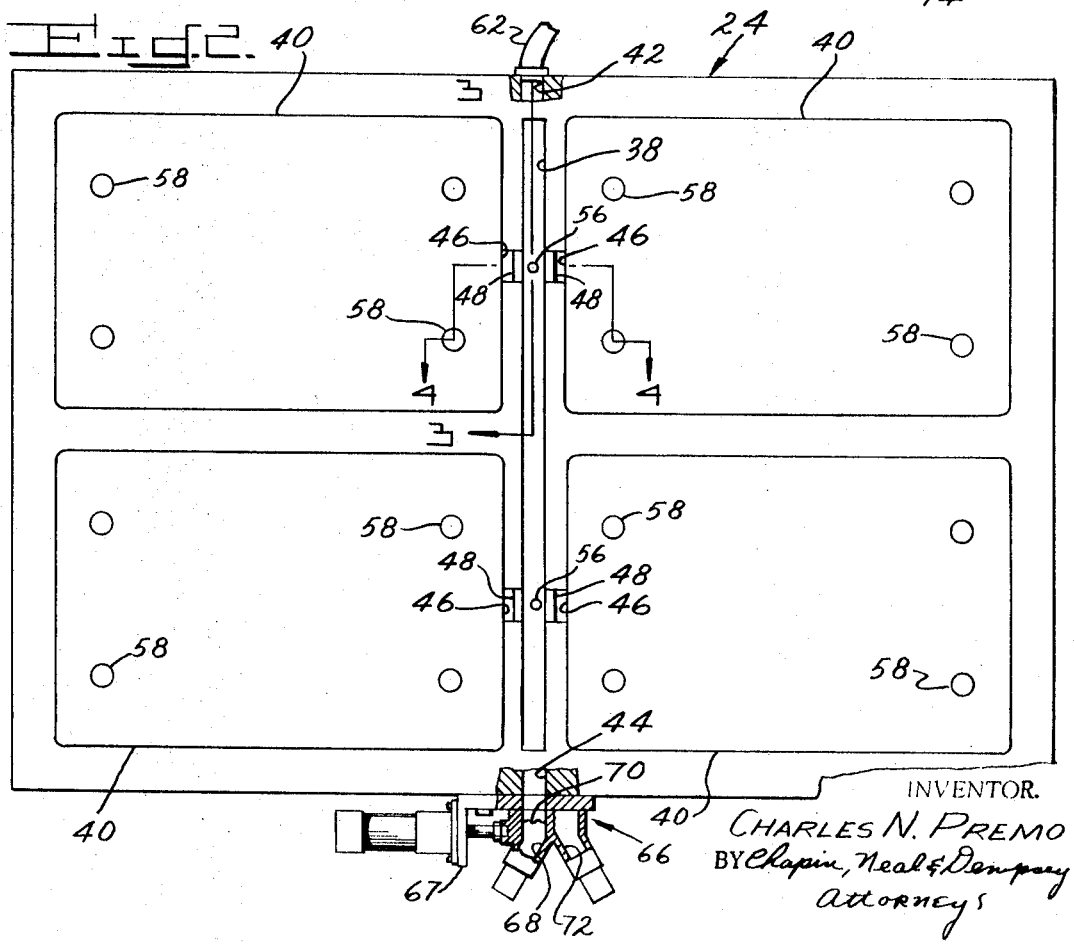

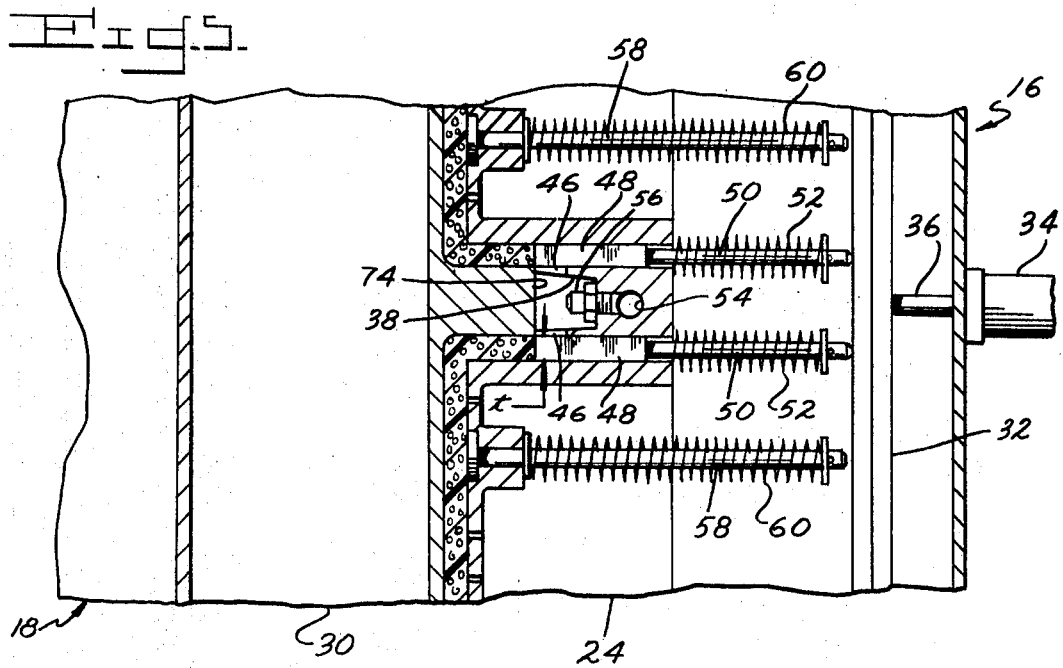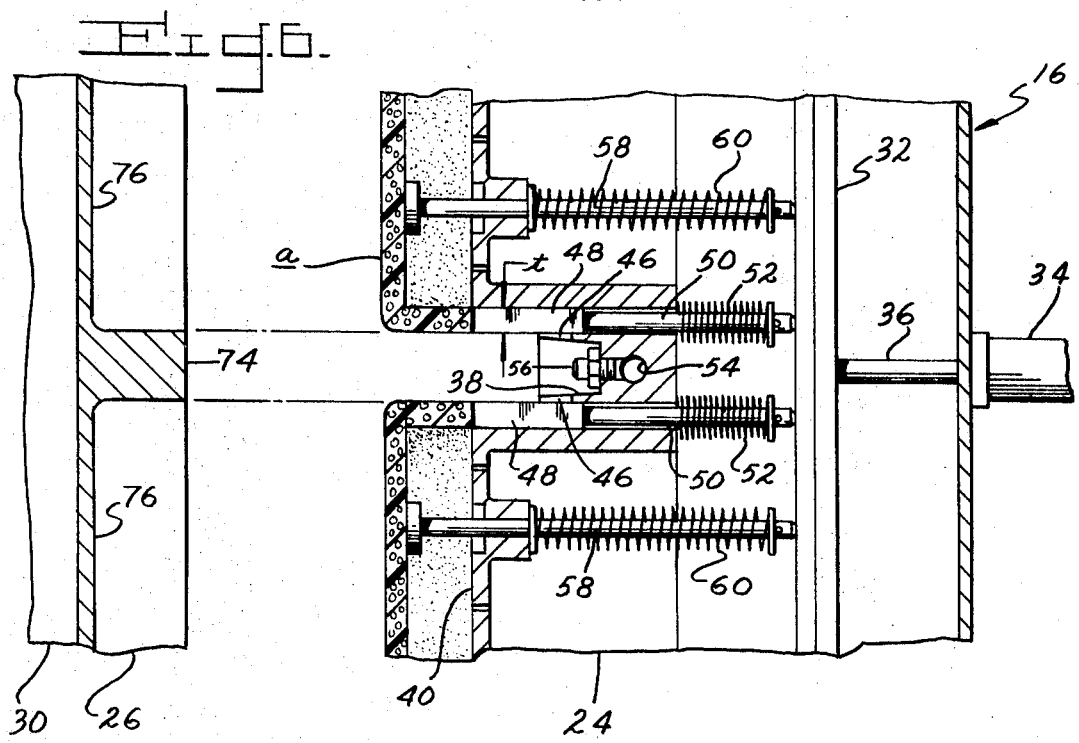

MOLD-CHARGING APPARATUS

BACKGROUND

This invention relates to molding apparatus for thermoplastic resins of the expandable bead type, such as polystyrene. In particular it relates to new and useful improvements for uniformly charging either single or multicavity molds.

As is generally known, "blow" filling is widely used for charging mold cavities with fluid-entrained expandable thermoplastic beads. However, the apparatus and techniques heretofore available did not give entirely satisfactory results in that uniformity of charging has been an ever present problem.

With reference to U.S. Pat. No. 3,159,875 to Stutz et al. it will be noted that a mold-charging apparatus having typical bead-charging means is shown therein. As depicted, the bead-charging means is comprised of a runner and a channel-shaped runner element which is mounted for reciprocal movement within said runner parallel to and vertically disposed on a mold face. As further shown, the runner element has a plurality of spaced transversely extending discharge openings along its length which are designed to communicate with each of said mold cavities upon reciprocation of said runner element from a noncharging to a charging position. As will be readily appreciated by those skilled in the art, the size of the discharge openings and their relative charging positions dictate a large amount of unused mold face in order to position the discharge openings in a noncharging position during a molding cycle.

While subsequent mold-charging means designs have made refinements in the runner element per se, manufacturing costs have also increased without a significant reduction in the incidence of nonuniform charging, in that single edge or corner filling techniques are still employed.

It is an object of this invention to provide mold-charging means which will permit uniform mold charging.

It is another object of this invention to provide mold-charging means which will permit maximum mold face use.

It is a further object of this invention to provide mold-charging means that is inexpensive to manufacture yet totally reliable.

It is another object of this invention to provide mold-charging means that may also be employed as positive mold ejection means.

The above and other objects and advantages of this invention will be more readily apparent from the following description and with reference to the accompanying drawings in which:

FIG. 1 is a partial side elevational view with parts broken away of a molding machine on which the mold-charging apparatus of the present invention is employed;

FIG. 2 is a view taken along line 2–2 of FIG. 1;

FIG. 5 is a view similar to FIG. 4 with the mold apparatus in a "cook" position; and FIG. 6 is a view similar to FIG. 4 with the mold faces parted and the mold apparatus in an eject position.

Figure 3:
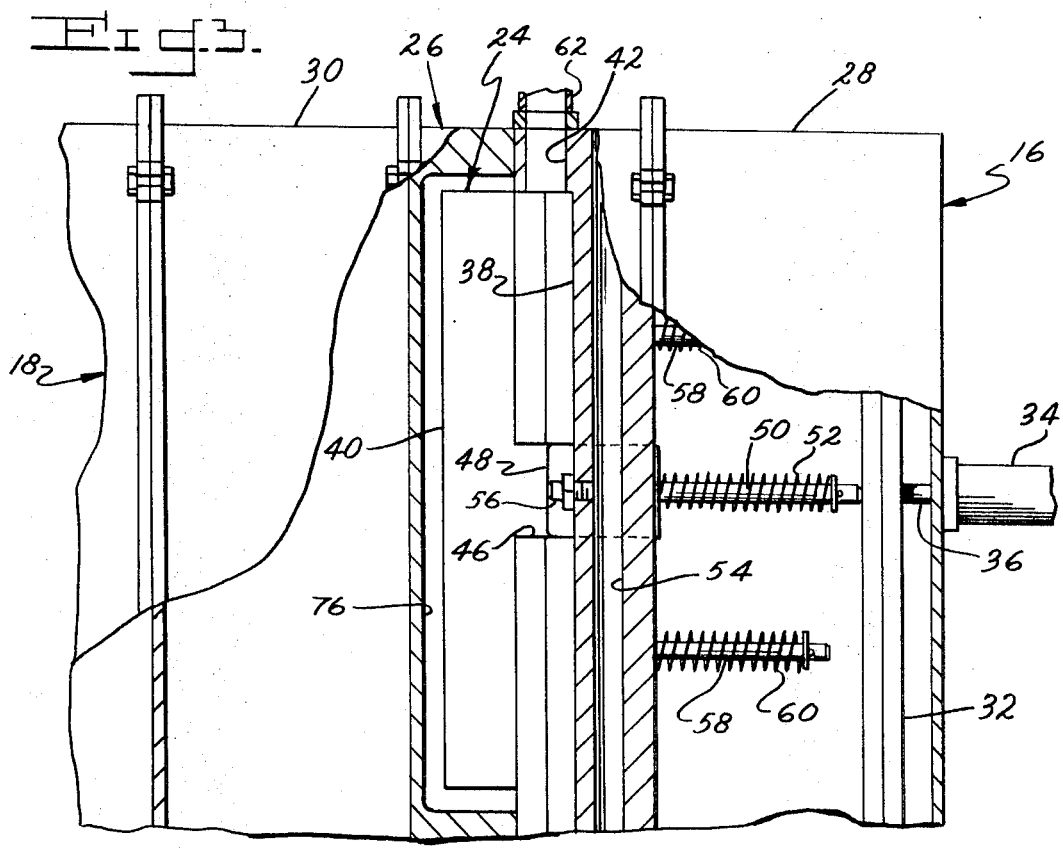
FIG. 3 is a partial longitudinal view with sections broken away of the male and female mole faces pressed together.

Referring primarily to FIG. 1, it will be seen that press apparatus, similar to that which is described in U.S. Pat. No. 3,159,875 noted above, is shown at 10. This apparatus consists primarily of upper support rails 12 and lower support rails 14 which are disposed in parallel relationship to one another. As further shown, the support rails support a stationary head platen 16 and a movable head platen 18 in vertical relationship relative to said rails 12 and 14. The movable head platen 18 is mounted on said rails by rollers (not shown) or similar means so as to be reciprocable relative to said stationary head platen 16. The reciprocable action of said movable platen 18 is provided by hydraulic means, such as by a hydraulic cylinder 20 mounted on the frame of the molding apparatus with its piston 22 affixed to the rear of said movable head platen 18.

The stationary head platen 16 has a removable mold face 24 vertically disposed on its inwardly facing end which, as shown, is the male portion of the die. This mold face 24 complements an oppositely facing removable mold face 26 which is vertically disposed on the movable head platen 18. Steam chest 28 is disposed behind and adjacent said mold face 24, while steam chest 30 is disposed behind and adjacent said mold face 26.

An ejector-spray plate 32 is disposed for reciprocable motion within steam chest 28. The reciprocable motion is provided by hydraulic or pneumatic means, such as cylinder 34, affixed to the rear of the stationary head platen 16 with its piston 36 extending through the rear wall of said head platen into contact with the ejector-spray plate 32. The reciprocable action of the ejector-spray plate 32 provides positive mold article ejection means as well as fill control means, which will be further explained below.

Figure 4:
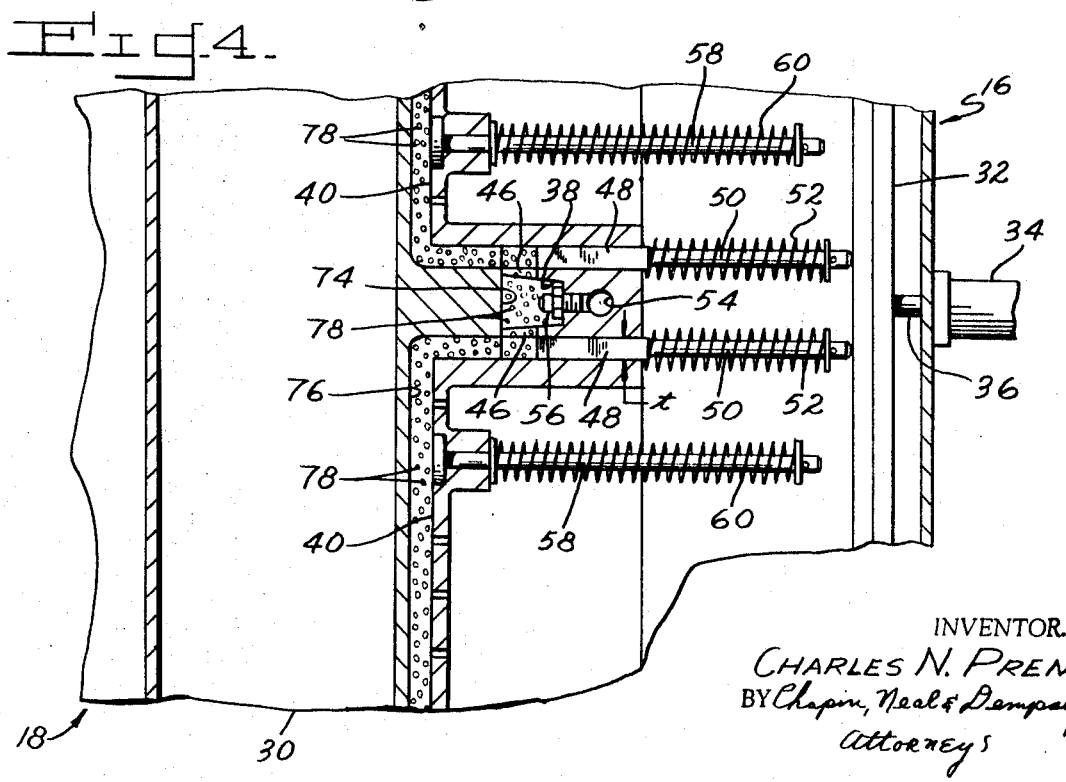
FIG. 4 is a partial section view taken along line 4–4 of FIG. 2 with the molding apparatus in a fill position.

Referring now to FIGS. 2, 3 and 4, it will be seen that the mold face 24 is provided with a vertically disposed U-shaped feeder slot 38 recessed within the body of the mold face between the male die members 40. Each end of the slot 38 terminates with an enclosed passageway 42 or 44, which passes to the outside of the mold face 24.

As shown, each die member 40 has at least one filling slot 46 associated therewith which is disposed in said mold face 24 adjacent to and communicating with the feeder slot 38. The filling slots 46 extend from the feeder slot 38 to a sidewall of the male die member 40 so as to underlie an edge of the mold space.

Gating means comprising a gate member or portion 48, a gate pin 50 and spring means 52 for biasing said gating means towards said ejector-spray plate 32, is reciprocably disposed in each filling slot adjacent the sidewall of the die member 40 and beneath the edge of the mold space. The thickness $t$ of the gate member 48 is designed to be at least as thick as the article to be molded at its edge so as to form a part of the walls which define the mold space.

Disposed adjacent said feeder slot 38, and running parallel therewith is air conduit 54. Valve means 56 is provided in connection with said filling slots 46 so that boost air in said air conduit 54 may be diverted towards said filling slots 46.

The mold article ejection means is provided by article ejector pins 58 loaded by springs 60 so as to bias them toward said ejector-spray plate 32. They are seated in the surface of the die members 40, and are actuated by the action of the ejector-spray plate 32.

With reference primarily to FIG. 2, it will be noted that feed line 62 communicates with passageway 42 for feeding thermoplastic expandable beads to said feeder slot 38. A two position pneumatic or hydraulic guillotine valve 66 mounted on bracket 67 is provided in association with passageway 44. As shown, this valve has two passageways therethrough. The first passageway 68 is provided with a screen 70 and functions as an exhaust, while the second passageway 72 is employed in returning unused thermoplastic beads to a supply hopper (not shown).

Referring now to FIGS. 3, 4, 5 and 6, it will be seen that in order for the feeder slot 38 to function, it is first necessary that the mold face 26 be brought into contact with its complementary mold face 24. Once this has been accomplished, as shown in FIGS. 4 and 5, a vertical web 74 which extends outwardly from the mold face 26 completely closes off the top of the feeder slot 38 so as to form a closed conduit with said feeder slot 38. As will be noted, the sidewalls of the web 74 also form part of the outside wall of the female die members 76.

OPERATION

As shown most clearly in FIGS. 2 and 3 the rest position of the apparatus is such that the ejector-spray plate 32 is positioned at its outermost point so that gate members 48 are biased by spring means 52 to a feed or open position and ejector pins 58 are biased by springs 60 to a rest position. Additionally, valve 66 is positioned in its exhaust attitude wherein passageway 68 with screen 70 therein is in line with passageway 44 at the bottom of feeder slot 38.

With the apparatus in the described attitude, an air supply to the feeder slot 38 associated with feed line 62 is actuated and the moldable thermoplastic beads 78 are "blown" into the feeder slot 38 from the supply hopper (not shown). With the aid of boost air supplied through conduit 54, the mold space is filled by the beads 78 passing into the mold space via open filling slot 46.

After the mold space has been filled (usually based on a preset time cycle) boost air in conduit 54 is terminated and the ejector-spray plate 32 is actuated by its pneumatic cylinder 34 so as to contact gate pins 50 and drive the gating means to a closed or "cook" position. At the same time, the bead feed from the supply hopper is shut off and valve 66 is positioned so as to line up passageway 72 with the feeder slot 38, whereby excess beads 78 in the feeder slot 38 are blown back to the supply hopper, see FIG. 5.

Once the feeder slot 38 has been cleared of all beads, the air supply to the feeder slot 38 is optionally terminated, and valve 66 returned to its exhaust or rest position.

At this point, the molding apparatus is brought to molding temperature by permitting a steam buildup in the steam chests 28 and 30 so as to "cook" the thermoplastic material. Subsequent to the "cook" cycle the apparatus performs a cooling cycle which is followed by the ejection of the molded article which is explained below.

As shown in FIG. 6, the ejection is commenced by first withdrawing the movable head platen 18 away from the stationary head platen 16 so as to part the mold faces 24 and 26. As is normally the case, the molded article *a* tends to adhere to the surface of the male mold face 24. In order to break this adherence, positive ejection means is actuated by the action of the ejector-spray plate 32 against the spring-loaded ejector pins 58 and the spring-loaded gate pins 50 of the gating means. As shown, the ejecting force exerted on the pins 58 and 50 pushes the molded article *a* away from the mold face 24.

Once the ejection has taken place, the apparatus is returned to its prefill or rest attitude as shown in FIG. 3.

From the above description, it should be clear to those skilled in the art, that each mold cavity may have more than one filling slot location. Furthermore, it should also be quite clear that feeder slot 38 may also be disposed so as to parallel more than one side of a mold cavity. Such flexibility of design is highly advantageous where one is concerned with an underfill problem as in the case of a molded article having a complex geometrical configuration.

I claim:

1. Apparatus for charging expandable thermoplastic beads to a mold cavity formed by a pair of complementary mold faces, said apparatus comprising a feeder slot disposed in one of said mold faces along at least one side of said mold cavity, at least one filling slot extending from said feeder slot to said mold cavity, gating means reciprocably disposed within said filling slot for controlling the flow of expandable thermoplastic beads from said feeder slot to said mold cavity, and means for actuating said gating means.

2. The apparatus of claim 1 wherein said gating means comprises a gate member slidably disposed in said mold face beneath one edge of said mold cavity, a gate pin affixed to said gate member and extending rearwardly of said mold face and spring means for biasing said gate member to a position wherein said filling slot is open.

3. The apparatus of claim 2 wherein said means for actuating said gating means comprises an ejector-spray plate disposed for reciprocable motion relative to and behind said mold face and in contact with said gate pin.

4. An apparatus for charging expandable polystyrene beads to a mold cavity formed by a pair of complementary mold faces, said apparatus comprises a feeder slot disposed in one of said mold faces along at least one side of said mold cavity, at least one filling slot extending from said feeder slot to said mold cavity, fill control and ejection means disposed within said filling slot and means for actuating said fill control and ejection means.

5. The apparatus of claim 4 wherein said fill control and ejection means includes a gate member slidably disposed in said filling slot, a spring-loaded gate pin affixed to said gate member and extending rearwardly of said mold face, said gate member being movable between a fill position and an ejection position by said actuating means.

6. Mold-charging and ejecting apparatus comprising in combination a pair of complementary mold faces which when closed form a plurality of mold cavities, a feeder slot disposed in one of said mold faces for conducting fluid-entrained expandable thermoplastic beads to said cavities, at least one filling slot connecting each of said cavities with said feeder slot, gating means disposed for reciprocable motion in each of said filling slots, and means for reciprocating said gating means between an open and an eject position.